Feb. 20, 1968
R. H. WILHELM
3,369,874
MIXTURE SEPARATION BY CYCLIC PULSING IN A TEMPERATURE
GRADUATED ADSORBENT BED
Filed Feb. 8, 1966
2 Sheets-Sheet 1
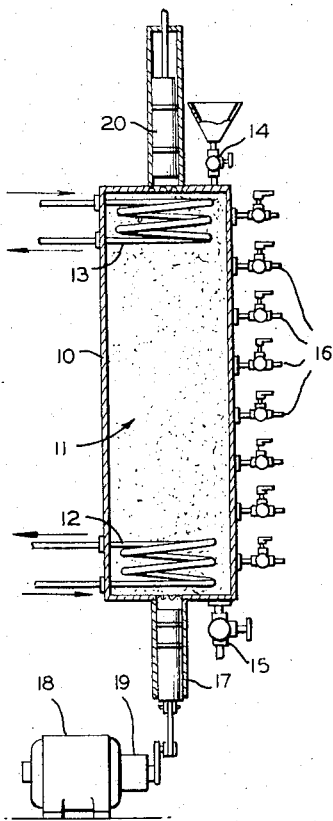
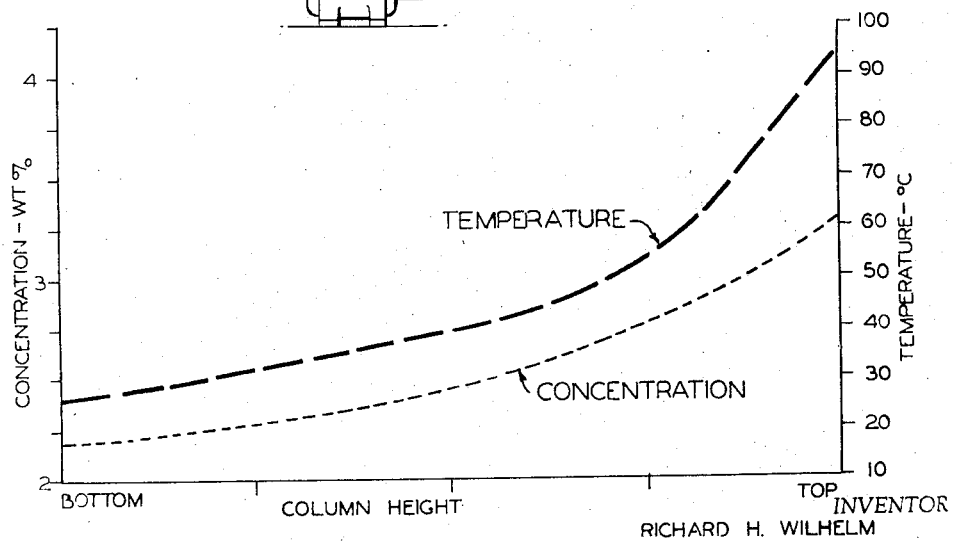
INVENTOR
RICHARD H. WILHELM
BY *Stawell & Stawell*
ATTORNEYS

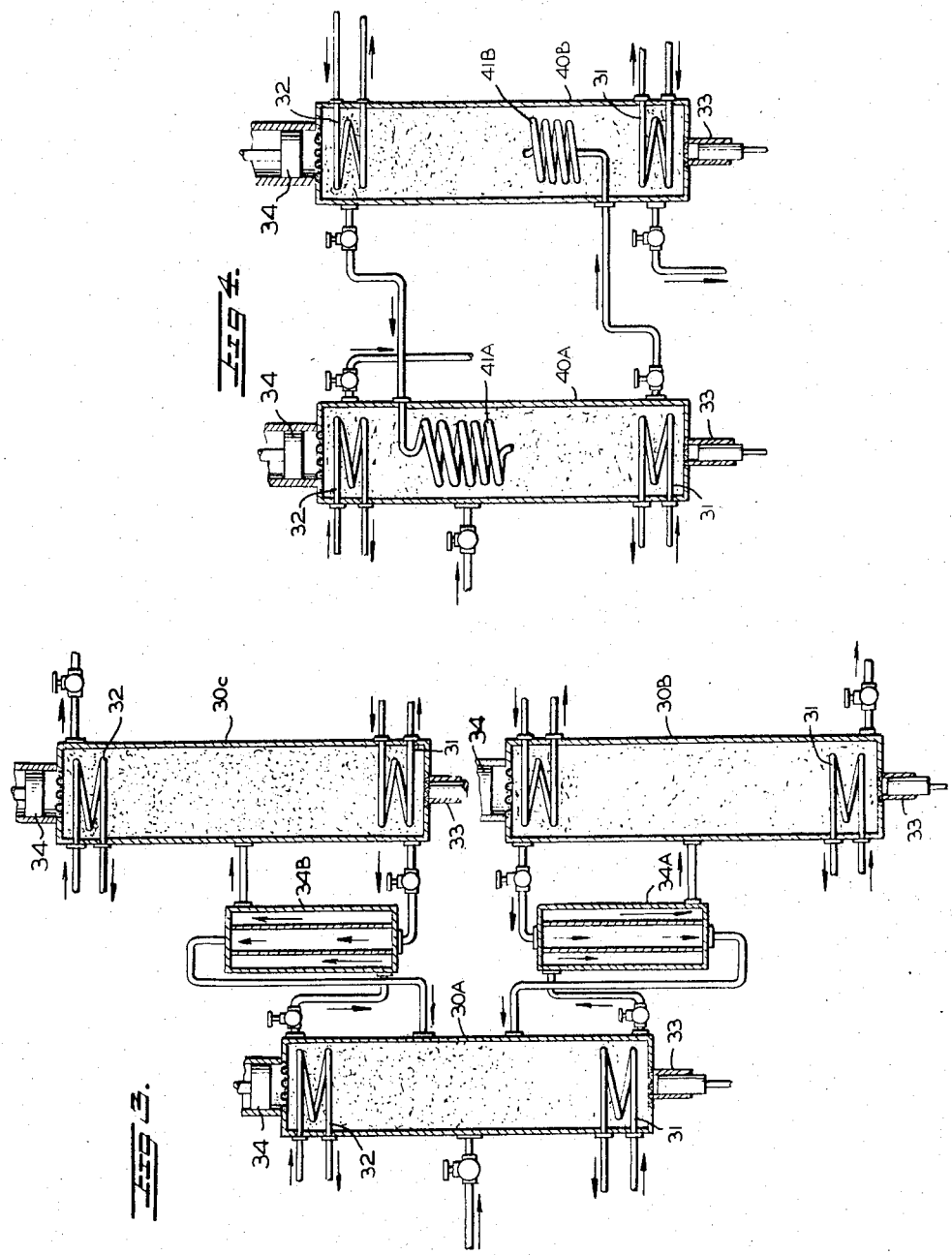

United States Patent Office 3,369,874
Patented Feb. 20, 1968

3,369,874
MIXTURE SEPARATION BY CYCLIC PULSING IN A TEMPERATURE GRADUATED ADSORBENT BED
Richard H. Wilhelm, Princeton, N.J., assignor to Research Corporation, New York, N.Y., a nonprofit corporation of New York
Continuation-in-part of application Ser. No. 228,958, Oct. 8, 1962. This application Feb. 8, 1966, Ser. No. 525,897
7 Claims. (Cl. 23—309)

This application is a continuation-in-part of application Ser. No. 228,958 filed Oct. 8, 1962.

The invention relates to a method and apparatus for concentrating or separating a component from a fluid composition.

A principal object of the invention is the provision of a method and apparatus whereby a substantial longitudinal concentration gradient of a component of a fluid composition may be established in an elongated body of the fluid composition.

The method of the invention involves the novel principle of contacting a fluid composition including a component to be separated therefrom with a fluid permeable elongated body of solid absorbent having a substantial temperature coefficient of adsorption for the component to be separated, maintaining a substantial temperature differential between the ends of the body of adsorbent, and cyclically displacing the fluid with respect to the body of adsorbent at a frequency which permits a substantial degree of temperature equilibration of the fluid with the solid adsorbent in contact therewith whereby a concentration gradient of the component in the fluid composition along the body is established. The amplitude of the displacement may be equal to, greater than or less than the length of the body of adsorbent.

The separation factor for a given composition will in general depend on:

The concentration of substance to be concentrated or separated;

The temperature differential maintained between the end portions of the body of adsorbent;

The absolute value and the temperature coefficient of the equilibrium constant of adsorption of the adsorbent for the substance to be concentrated or separated. These parameters are fixed by the selection of the adsorbent;

The amplitude and frequency of the cyclical displacement or pulsing of the fluid in contact with the body of adsorbent and the length of the body.

Other variables which affect the separation factor are determined by the properties of the particular composition being separated, of the adsorbent material and of any heat absorbing material which may be used.

The adsorbent material may advantageously be supported in a single vertical column or in various cascade arrangements of columns, illustrative examples of which will be given hereinafter. The body of adsorbent is not necessarily elongated in a vertical direction but may be elongated horizontally or at an angle to the horizontal. Moreover, the transverse sectional area of the body of adsorbent need not be uniform but may vary stepwise or continuously along the length of the body. Multiple feed and removal points may be provided along the length of the body of adsorbent and auxiliary pulsers may be provided at intermediate points.

Auxiliary heaters and/or coolers can be provided intermediate the ends of the body of adsorbent to modify the shape of the temperature gradient lengthwise of the body.

The principles of the invention may be applied to the concentration of components of a wide variety of fluid compositions including gaseous mixtures, aqueous solutions, organic solutions and organic liquid mixtures, limited only by the availability of a solid adsorbent having differential adsorption power for a component of the composition. Typical adsorbents are silica gel, adsorbent carbons, ion exchange resins, which may be anionic, cationic, combined or mixed, chromatographic solids, such as parting liquids carried by particles of kieselguhr, and other types of adsorbents well known in the chemical engineering art. In some cases, improved operation may be obtained by admixing with the adsorbent inert heat absorbing particles such as sand, glass beads and the like. In general, particularly for the treatment of liquids, the particle size of the heat absorbing material should be larger than the size of the adsorbent particles, for example, in the ratio of about 10 to 1.

In general, the lower temperature limits of the separation process should be as low as the properties of the fluid under treatment permit as the maximum theoretical separation is inversely proportional to the square of the average absolute temperature at which the separation is carried out. Thus, by operating at very low temperature high rates of separation of low boiling substances such as the gaseous components of air and helium in natural gases should be attained.

Concentration of components of fluids in accordance with the principles of the invention may be carried out in conjunction or association with chemical reactions, either homogenous or heterogenous and either within or outside the body of adsorbent, producing a component to be concentrated by the method of the invention.

While the separation factor for a given composition which can be achieved by a single stage operation is limited by the temperature differential which can be maintained between the ends of adsorbent column, this limitation can be overcome in various ways. With many liquid compositions the usable operating temperature differential can be substantially increased by carrying out the separation operation under increased pressure whereby the hot end of the column can be maintained at a temperature above the normal boiling point of the liquid composition. This method of increasing the temperature differential is limited by increased costs of apparatus construction, upper temperature limits of chemical and physical stability of the adsorbent and other factors.

A more general method of increasing the overall separation factor within a given temperature differential is by passing the liquid from one or both ends of the column to one or more successive similar stages, preferably returning effluent from successive stages to preceding stages at levels therein where the composition of the liquid in the preceding stage is approximately the same as that of the returning liquid and the temperature of the returning liquid is adjusted, for example, by external or internal heat exchange, to substantially the temperature of the column at the level of return.

The principles of the invention may also be applied to the concentration of a plurality of components in successive portion of a continuous body of adsorbent or in successive stages of operation.

The shape of the cyclical pulse waves is not critical. Sinusoidal wave pulses are readily provided and, in general, are preferable, but square, triangular or other shapes of continuous or intermittent pulse waves may be used.

The principles of the invention will be further disclosed with reference to the accompanying drawings in which:

FIG. 1 is a diagrammatic representation of a concentrating apparatus embodying the principles of the invention;

FIG. 2 is an illustrative graph of the relative temperature and composition gradients obtainable by the method of the invention;

FIG. 3 is a diagrammatic representation of one form of multiple stage apparatus with external heat exchange between stages; and FIG. 4 is a diagrammatic representation of another arrangement of multiple stage apparatus with internal heat exchange between stages.

The apparatus of FIG. 1 is primarily useful for test and investigational purposes. For such purposes it is usually operated on a batch basis, but it can readily be adapted with minor changes for operation on a continuous basis. The apparatus comprises an elongated vessel 10 adapted to support a column of solid adsorbent 11. A cooling coil 12 is provided at the lower end of the column and a heating coil 13 at the upper end.

Adsorbent and liquid compositions to be concentrated may be supplied through inlet 14 and removed through outlet 15. Petcocks 16 provide for sampling the liquid in the column at various levels and thermometric means (not shown) are provide for indicating the temperature at comparable levels.

The liquid in the column is subjected to cyclical pulses by means of piston 17 driven by motor 18 through speed reducer 19. Floating piston 20 seals the upper end of the column against evaporation.

In a test determination of a typical separation factor obtained with apparatus of the type illustrated in FIG. 1, the container 10 was packed with a mixture of an anionic and a cationic ion absorbing resin (Amberlite IRC 50 and Amberlite IR 45 in the proportion of 1 to 1 by volume). The container was then filled with a 2.8% aqueous solution of sodium chloride and steam was supplied to heating coil 13 and cooling water to cooling coil 12.

The liquid in the column was pulsed by operation of piston 17 at a frequency of 6 minutes per cycle and a stroke of $\frac{1}{20}$ of the length of the column (27 inches). At approximate equilibrium the temperature and concentration gradients along the column were as shown in FIG. 2. The temperature range was from about 27° C. at the bottom to about 95° C. at the top of the column and the concentration range was from about 2.18% at the bottom to about 3.25% at the top. The separation factor for the adsorbent and conditions tested was about 1.5.

To operate the apparatus of FIG. 1 on a continuous basis, liquid to be concentrated is supplied to the midportion of adsorbent column 11, through a suitable supply duct not shown, and concentrate is withdrawn from the top of the column and depleted liquid from the bottom, the total volume of withdrawn liquid being equivalent to the volume of liquid fed to the column. The supply and withdrawal may be continuous or intermittent. The rate of supply of feed liquid is so proportioned to the total liquid volume in the column as to approximate the economically maximum rate of concentration. For any given materials and operating conditions, the economic optimum feed rate can be determined empirically and can be calculated from experimentally determined data.

In the apparatus of FIGS. 3 and 4, cooling coils are designated 31, heating coils 32, pulsing pistons 33 and floating pistons 34 throughout.

In the apparatus of FIG. 3, the outflow from the bottom of column 30A is fed to column 30B intermediate the ends thereof in heat exchange with outflow from the top of column 30B in exchanger 34A and the outflow from the top of column 30A is fed to column 30C intermediate the ends thereof in heat exchange in exchanger 34B with the outflow from the bottom of column 30C.

Top outflow from column 30B and bottom outflow from column 30C are returned to column 30A at levels wherein the temperature and concentration conditions are approximately the same as those of the returning liquids.

The bottom outflow from column 30B and the top outflow from column 30C, or either of them, may be similarly fed to further stages or withdrawn for further treatment or to waste.

In the apparatus of FIG. 4 only the bottom outflow from column 40A is fed to a further stage 40B and the top outflow from column 40B is returned to column 40A. In each case the interchanged liquids are passed into the receiving columns at levels having approximately the temperatures of the inflowing liquids and are intermixed with the liquid in the receiving columns, after passing through internal heat exchangers 41A and 41B, at levels wherein the liquid compositions are approximately those of the inflowing liquids.

Top outflow from column 40A and bottom outflow from column 40B, or either of them, may be similarly fed to further stages or withdrawn for further treatment or to waste.

It will be seen that the invention provides a method of concentrating components of fluid compositions by a counter-current adsorptive process in which the body of adsorbent is not moved and in which no separate chemical regeneration step is required, the countercurrent operation being effected by the dynamic cyclic transfer of heat and mass lengthwise of the body.

From the foregoing description of the principles of the invention and the illustrative examples, many variations in the operating conditions and in the design and arrangement of apparatus will be apparent to skilled chemical engineers and all such variations are included within the scope of the invention as defined in the claims.

I claim:

1. The method of concentrating a component of a liquid mixture comprising contacting the liquid mixture with a liquid permeable stationary column of solid adsorbent, flowing the liquid through the column of adsorbent while maintaining a substantial temperature differential between the ends of the column of adsorbent, and simultaneously cyclically displacing the liquid as it flows through the column of adsorbent with respect to the column of adsorbent at a frequency such that it establishes a substantial degree of heat exchange between the liquid and the solid adsorbent in contact therewith to establish a temperature gradient along the column, thereby establishing a concentration gradient of a component of the liquid mixture along the column.

2. The method of concentrating a component of a liquid mixture comprising contacting the liquid mixture with a liquid permeable stationary column of solid adsorbent, flowing the liquid through the column of adsorbent while maintaining a substantial temperature differential between the ends of the column of adsorbent, and simultaneously cyclically displacing the liquid as it flows through the column of adsorbent with respect to the column of adsorbent at a frequency such that it establishes a substantial degree of heat exchange of the liquid with the solid adsorbent in contact therewith to establish a temperature gradient along the column, thereby establishing a concentration gradient of a component of the liquid mixture along the column, supplying increments of the liquid mixture intermediate the ends of the column and removing liquid from both ends of the column in amounts totaling in volume the volume of liquid supplied.

3. The method defined in claim 2 wherein the liquid removed from at least one end of the column is supplied to a further column of the adsorbent intermediate the ends thereof, flowing the removed liquid through the further column of adsorbent while maintaining a substantial temperature differential between the ends of the further column, cyclically displacing the liquid in the further column with respect to the body of adsorbent therein at a frequency such that it establishes a substantial degree of heat exchange between the liquid and the adsorbent in contact therewith and removing liquid from both ends of said further column in amounts totaling in volume the volume of liquid supplied thereto.

4. The method defined in claim 3 wherein liquid from one end of said further column is returned to the first defined column at a level therein where the composition of the liquid in the column is approximately the same as the composition of the liquid returned from the further column.

5. The method as defined in claim 4 wherein the temperature of the liquid returned from the further column is adjusted to substantially the temperature of the column at the level of return.

6. The method of concentrating a solute in an aqueous solution thereof comprising contacting the solution with a permeable stationary column of a solid adsorbent for the solute, flowing the aqueous solution through the column of adsorbent while maintaining a substantial temperature differential between the ends of the column of adsorbent, and simultaneously cyclically displacing the solution with respect to the column of adsorbent at a frequency such that it establishes a substantial degree of heat exchange between the solution and the adsorbent in contact therewith to establish a temperature gradient along the column, thereby establishing a concentration gradient of the solute along the column.

7. The method defined in claim 6 wherein the solute is an ionizable salt and the adsorbent is an ion exchange composition.

References Cited

UNITED STATES PATENTS

| 2,427,042 | 9/1947 | Bowman | 23—273 X |
| 2,709,643 | 5/1955 | Peery | 23—267 X |
| 2,743,818 | 5/1956 | Higuchi | 55—386 |
| 2,764,620 | 9/1956 | Findlay | 210—24 X |
| 2,904,507 | 9/1956 | Jahnig | 55—389 X |
| 3,162,513 | 12/1964 | Torroux | 55—389 X |
| 3,174,832 | 3/1965 | Bohrer | 23—273 |
| 3,192,126 | 6/1965 | Fear | 23—267 X |
| 2,064,422 | 12/1936 | Fenske | 23—270.5 X |

OTHER REFERENCES

Barry: Chemical Engineering, vol. 67, No. 3, Feb. 8, 1960, pp. 105 to 120 (copy Sci. Library).

NORMAN YUDKOFF, *Primary Examiner.*

S. EMERY, *Assistant Examiner.*